March 7, 1967 H. JUDIN 3,308,275

ELECTRICAL FUNCTION GENERATOR USING OPTICAL SCANNING TECHNIQUES

Filed June 19, 1962 3 Sheets-Sheet 1

March 7, 1967 H. JUDIN 3,308,275

ELECTRICAL FUNCTION GENERATOR USING OPTICAL SCANNING TECHNIQUES

Filed June 19, 1962 3 Sheets-Sheet 2

United States Patent Office 3,308,275

Patented Mar. 7, 1967

3,308,275

ELECTRICAL FUNCTION GENERATOR USING OPTICAL SCANNING TECHNIQUES

Herbert Judin, Huntington, N.Y., assignor to Aeroflex Laboratories Incorporated, a corporation of Delaware Filed June 19, 1962, Ser. No. 203,650
9 Claims. (Cl. 235—61.11)

This invention relates to electric function generators and, while it is of general application, it is particularly suitable to the generation of a periodic wave having a wave form which is a reproduction of any arbitrary function represented by a two-dimensional graph of the function.

In many instrumentation and computer systems, it becomes desirable to introduce into the system an electrical signal having a wave form representative of some arbitrary function as derived from the solution of mathematical equations, the empirical measurement of transients, mathematical operations or conversions of certain parameters from one form to another, such as integration, differentiation, logarithmic or anti-logarithmic conversions, etc. Heretofore, there has been no simple and straightforward method of generating such electric functions.

It is an object of the invention, therefore, to provide a new and improved electric function generator capable of developing an electrical signal of a wave form representative of any arbitrary function and one which is relatively simple and inexpensive in construction and flexible and accurate in operation.

In accordance with the invention, there is provided an apparatus for generating an electrical signal which is a representation of a function graphically illustrated on a sheet, comprising an arcuate holder for the sheet, means for scanning a sheet disposed on the holder and translating a continuous image of a narrow ordinate section of the sheet as it is scanned, means for continuously varying the amount of light translated in the image of each section of a graph on the sheet as it is scanned as a function of the instantaneous ordinate thereof, and photoelectric means for continuously converting the limited translated image to an electrical signal.

For a better understanding of the present invention, together with other and further objects thereof, reference is had to the following description taken in connection with the accompanying drawings, while its scope will be pointed out in the appended claims.

Referring to the drawings:

FIG. 5 is a cross-sectional view of the apparatus of FIG. 4, while

Figure 1:
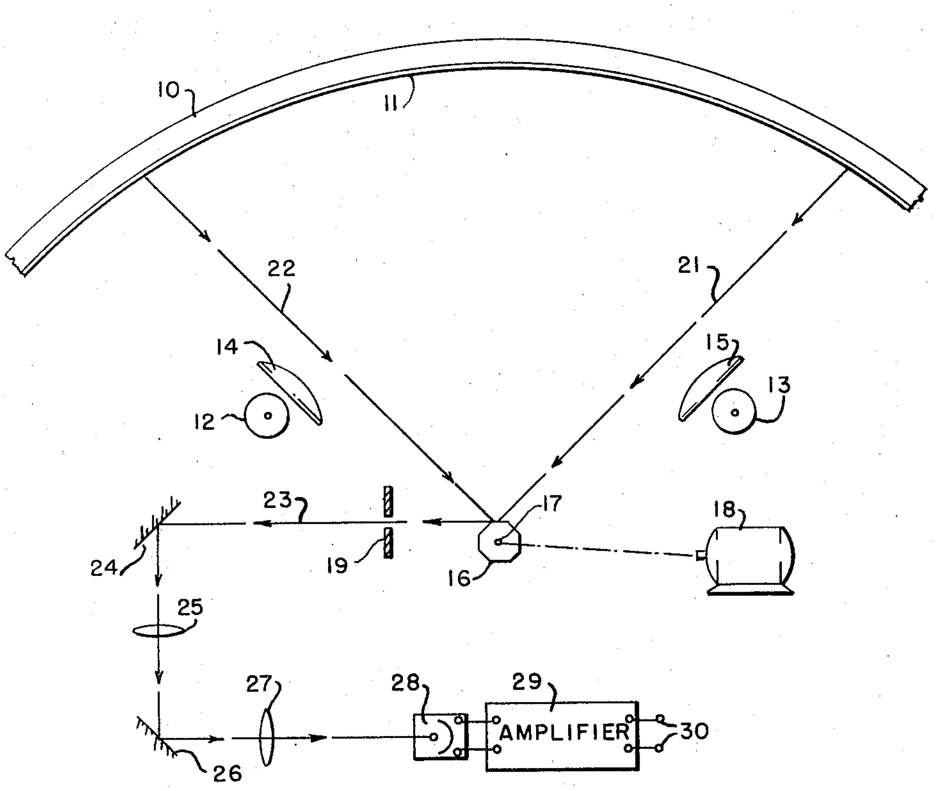
FIG. 1 is a schematic representing of a complete electric function generator embodying the invention.

Referring now to FIG. 1 of the drawings, there is represented schematically an apparatus for generating an electrical signal which is a representation of a function graphically illustrated on a sheet. This apparatus comprises a stationary arcuate holder 10, on the interior of which is mounted a sheet 11 on which is drawn a graph of the function to be generated. As illustrated, this holder extends over an arc of approximately 90°. The apparatus also includes means for illuminating the graph sheet 11, preferably uniformly. This may be in the form of a pair of elongated tubular lamps 12 and 13 and associated flooding lenses 14 and 15, respectively. The graph of the function on the sheet 11 may be any arbitrary function, for example that representted by curve A of FIG. 3. It should be drawn in some medium that provides a high contrast in reflectivity relative to the body of the sheet 11. For example, the sheet 11 may be purposely treated to provide low reflectivity while curve A may be drawn with a silver base or other ink of high reflectivity.

The apparatus of FIG. 1 further includes means for scanning a sheet 11 disposed on the holder 10 and translating a continuous image of a narrow ordinate section of the sheet as it is scanned. Specifically, this scanning means includes an eight-sided mirror 16 rotatable about an axis 17. The axis 17 of the mirror 16 is disposed in an axial plane of the holder 10 and is preferably coaxial or nearly coaxial therewith. The apparatus further includes means, such as a motor 18, for producing relative rotation between the holder 10 and the mirror 16; for example, the holder 10 may be stationary and the mirror 16 rotatable by the motor 18, whereby the mirror scans the graph on the sheet 11 during rotation.

The apparatus of FIG. 1 further comprises means for continuously varying the amount of light translated in the image of each section of a graph on the sheet 11 as it is scanned as a function of the instantaneous ordinate thereof. This means may be of any well known type, such as a variable-density optical wedge or, as shown in detail in FIG. 2, in the form of a mask 19 provided with an elongated tapered slot 20, the axis of which is parallel to the axes of the holder 10 and the mirror 16 and disposed in the path of the light reflected by the mirror. By way of example, there are shown in FIG. 1, two light rays 21 and 22 reflected from opposite ends of the curved sheet 11 during its scansion by the mirror 16. Each of these rays, and rays of any intermediate position, are reflected to strike the mask 19 and pass through the slot 20, as indicated by the ray 23.

The apparatus of FIG. 1 further includes photoelectric means for continuously converting the limited reflected image to an electrical signal. As shown, the ray 23 passing through the mask 19 passes through an optical system comprising a 45° reflector 24, an objective lens 25, a second 45° reflector 26, and a field lens 27 to a photoelectric device 28 which may be a conventional photomultiplier. The electrical signal developed by the photoelectric device 28 is applied to an amplifier 29 and thence to output terminals 30, which may be connected to any suitable utilization circuit.

Figure 2:
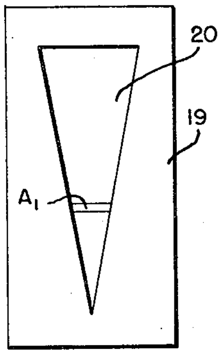
FIG. 2 is a detailed view of an optical slit suitable for use as one of the elements of the apparatus of FIG. 1.
Figure 3:
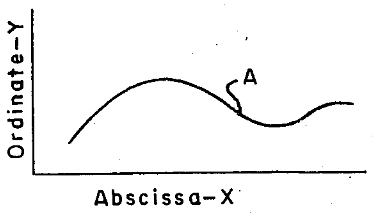
FIG. 3 is a graph of a typical arbitrary function of which the apparatus of FIG. 1 is capable of generating an electrical representation.

It is believed that the operation of the function generator of the invention will be apparent from the foregoing description. In brief, the graph of any function to be represented, such as that of curve A of FIG. 3, is drawn on a sheet 11 in some medium providing a high contrast in reflectivity. The mirror 16, as it is rotated, effectively picks up an image of a narrow segment of the sheet 11 in the abscissa direction and reflects it onto the elongated mask 19. The length of the reflected segment of curve A, such as the segment $A_1$ of FIG. 2, is seen to be proportional to its Y or ordinate value. Because of the high contrast in reflectivity between the segment $A_1$ and its background field, the total light flux passed by the mask 19 will vary with the ordinate of the segment $A_1$ as curve A is scanned by the mirror 16. This beam of light of modulated intensity is passed through the optical system 24, 25, 26, 27 to the photoelectric device 28, wherein there is developed an electrical signal varying with the intensity of this light beam and, after amplification in the amplifier 29, appears at the output terminals 30 for utilization.

As illustrated, the mirror 16 is connected to the motor 18 for continuous rotation, in which event the electrical signal appearing at the output terminals 30 is a periodic signal, each cycle of which has the wave form of curve A. Obviously, if it were desired to generate an electric function representative of only a single transient, arrangements would be made to rotate the mirror 16 through only 45°.

Figure 4:
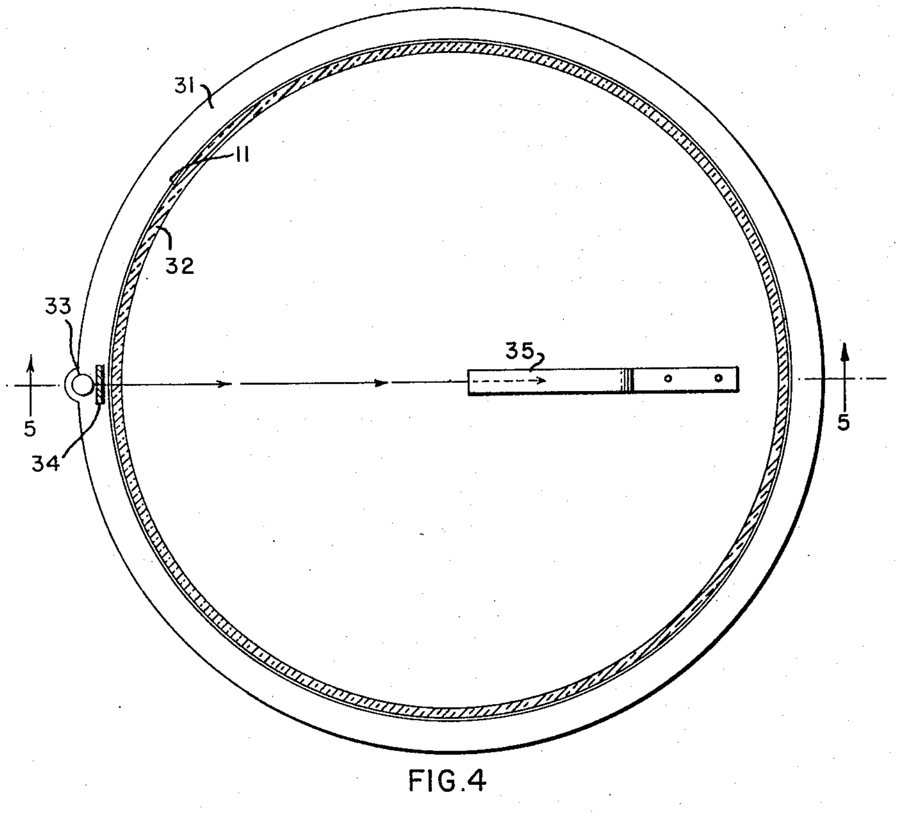
FIG. 4 is an end view of a modified form of electric function generator embodying the invention.
Figure 5:
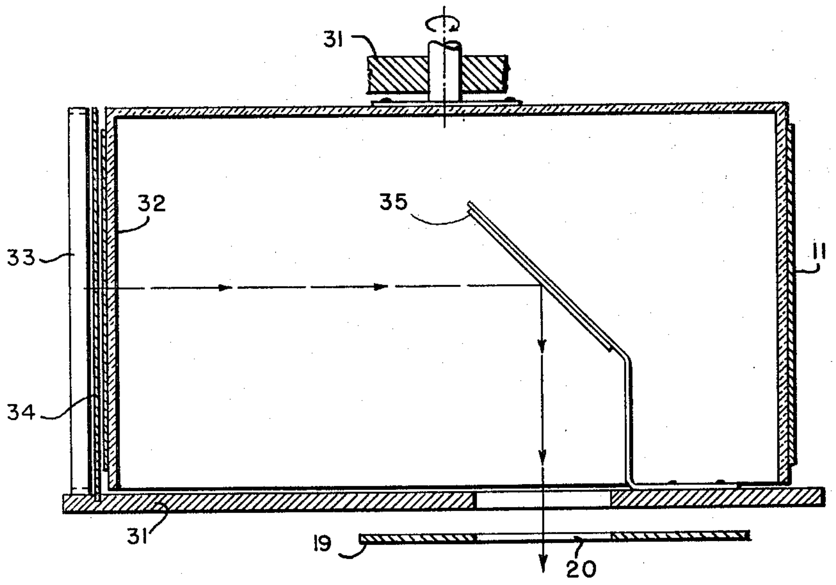

Referring now to FIGS. 4 and 5, there is illustrated a modified form of the invention particularly suitable for use in generating a period electric function. The apparatus of FIGS. 4 and 5 includes a supporting frame 31 in which is journalled a sheet holder 32 in the form of a translucent rotatable cup-shaped member or cylinder, for example of glass or transparent plastic. In this case, the record sheet 11 is wrapped around and secured to the outer cylindrical surface of the sheet holder 32. An elongated lamp 33 is mounted adjacent and outside the holder 32 and lying in a diametral plane thereof. Preferably, a light-diffusing member, such as a ground glass strip 34, is interposed between the lamp 33 and the holder 32. In this case, the scanning means is in the form of a stationary elongated mirror 35 inclined substantially 45° to the axis of the holder 32 so that it reflects light picked up from scanning the sheet 11 through the mask 19, which may be of the same form as that illustrated in FIG. 2.

The operation of the electric function generator of FIGS. 4 and 5 is the same as that described above with respect to FIGS. 1 and 2 except that the image of the graph is developed on the mirror 35 by transmission through the sheet 11 and the translucent sheet holder 32 rather than by reflection from the sheet. In this case, it is desirable that there be a high contrast between the light transmissivity of the drawn graph line and the background of the graph sheet. For example, the graph may be drawn with a dense opaque medium such as India ink on a sheet of transparent or translucent material. Preferably, however, there is developed a photographic negative of such a graph so that the line function is essentially transparent and the background essentially opaque.

Figure 6:
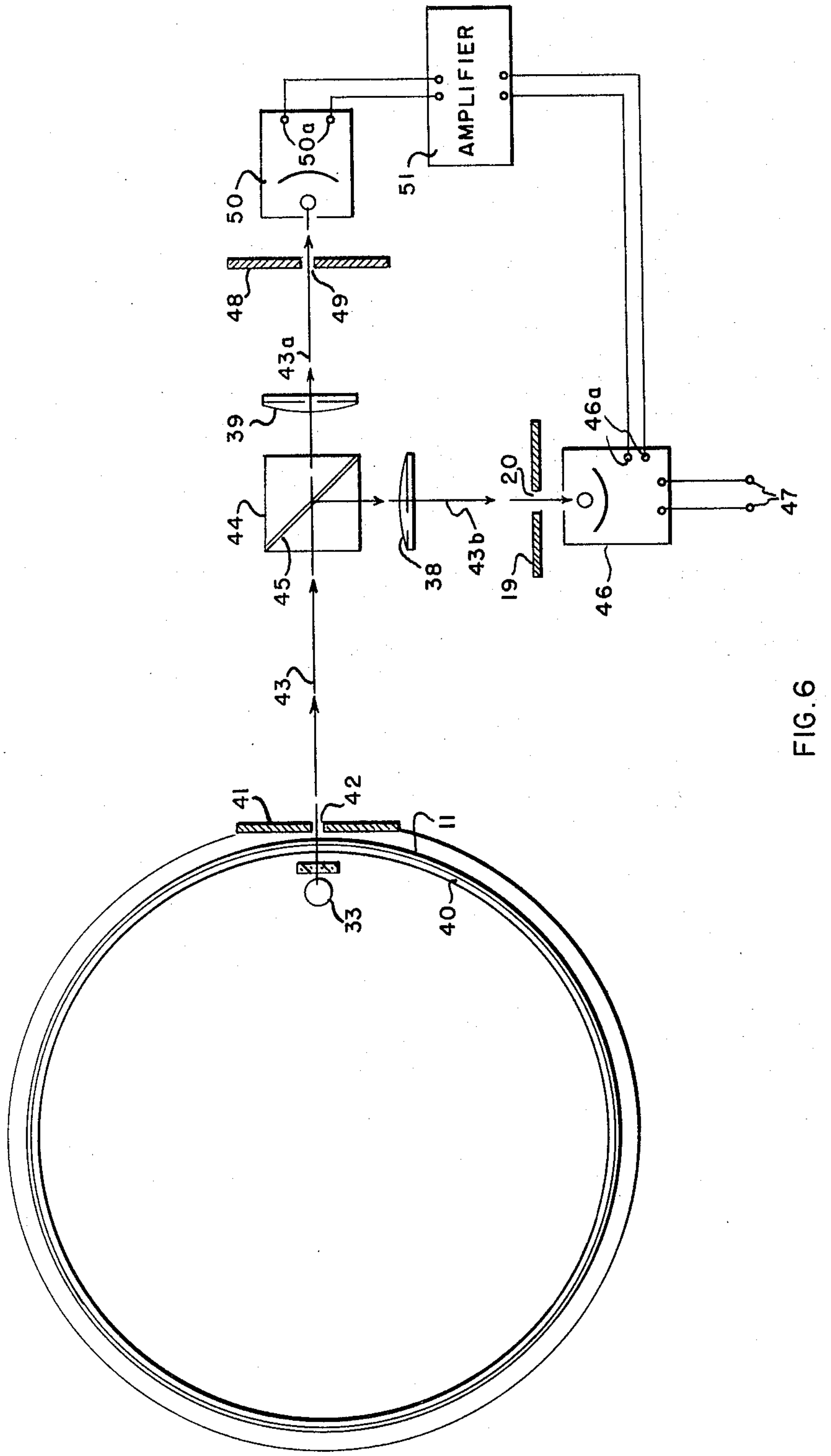
FIG. 6 is a schematic representation of a further embodiment of the invention.

In FIG. 6 is represented a modified form of electric function generator embodying the invention. This apparatus includes a holder in the form of a rotatable cylinder 40 of translucent or transparent material such as glass or plastic, on which the graph sheet is mounted. The apparatus includes an elongated lamp 33 and light-diffusing strip 34 which may be similar to corresponding elements of FIGS. 4 and 5. These elements are disposed inside the holder 40 and both lie in an axial plane of the holder 40.

In the modified apparatus of FIG. 6, the scanning means includes a mask 41 having an elongated narrow slit 42 disposed outside the holder 40 and registering with the lamp 33, as by lying substantially in the same axial plane of the holder 40. The width of the slit 42 is preferably of the order of 1–2% of the abscissa dimension of the graph. The beam passing through the slit 42 as the graph sheet 11 is scanned, indicated schematically at 43, is impressed upon a beam-splitter 44 of any conventional construction, for example, an elongated optical element of square cross-section with a diagonal interface 45 half-silvered, so that the beam 43 is divided into two substantially equal portions, a portion 43*a* passing through the interface 45 and a portion 43*b* reflected therefrom.

The apparatus of FIG. 6 further includes means for continuously varying the amount of light translated by the image-beam portion 43*b* corresponding to each section of a graph on the sheet 11 as it is scanned as a function of the instantaneous ordinate thereof, this means being in the form of a mask 19 having an elongated tapered slit 20, this element being similar in construction to that illustrated in FIG. 2. A lens 38 may be inserted in the optical path of the beam 43*b* to bring the beam to convergence at the slit 20. There is also provided photoelectric means for continuously converting the image translated through the slit 20 into an electrical signal, which means may be a photosensitive device, such as a photomultiplier 46, similar to the photomultiplier 28 of FIG. 1 and having output terminals 47 from which the function-representative electrical signal may be derived.

As so far described, the signal output of the photomultiplier 46, as is true also of the photomultiplier 28 of FIG. 1, will develop an electrical signal varying with the intensity of illumination of the graph sheet 11, the length and thickness of the image of the section of the curve passing through the slits 42 and 20, the light tranmissivity of the graph sheet 11 (or its reflectivity, in the form of the invention shown in FIG. 1), the line voltage of the electrical portion of the system, and other system parameters. Inevitably, significant errors may be introduced by variations of these parameters from their nominal values. These errors are substantially compensated, in the embodiment of FIG. 6, by including means responsive to the image beam 43 translated by the scanning slit 42 for developing a second electrical circuit and circuit means, responsive to such second electrical signal, for modifying the electrical signal developed at the terminals 47 to compensate for the undesired variations in system conditions. Specifically, the image-beam portion 43*a*, which is always a constant fraction of the image beam 43, is impressed upon a mask 48 having an elongated slit 49 of constant width and the beam emerging therefrom is impressed upon a second photosensitive device, such as a photomultiplier tube 50, effective to develop at its output terminals 50*a* an electrical signal varying in amplitude with the intensity of the beam 43 emerging from the slit 42, which signal appears at output terminals 50*a*. A lens 39 is inserted in the path of the beam 43*a* to converge the beam upon the slit 49. This signal is impressed upon a conventional amplifier 51 and, thence, upon terminals 46*a* of photomultiplier 46 for varying the gain of this device in accordance with variations in the intensity of the beam 43 from the scanning slit 42.

The operation of the electric function generator of FIG. 6 is generally similar to those described above. In this instance, however, the scanning is effected by the slit 42 adjacent the sheet holder 40, rather than by a mirror. The amplified signal output from the photomultiplier 50 is preferably impressed upon the dynode string of the photomultiplier 46 in a sense to alter the gain of the photomultiplier inversely with the strength of the applied signal. With this arrangement, the electrical signal appearing at the output terminals 47 is equal to the ratio of the electrical signal developed by the beam passing through the slit 49 of uniform width to that developed by the beam passing through the slit 20 of tapered width. It can be shown that, by thus varying the gain of the photomultiplier 46, the signal appearing at the output terminals 47 will be substantially a correct representation of the abscissa length of the section of the graph transmitted through the slit 20 and substantially independent of variations in the system conditions, as described above.

While there have been described what are, at present, considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An apparatus for generating an electrical signal which is a representation of a function graphically illustrating on a sheet by a contrasting line of substantially uniform width comprising:

(a) an arcuate holder for the sheet;

(b) an eight-sided mirror disposed coaxially with said holder;

(c) means for producing relative rotation between said holder and said mirror, whereby said mirror scans said graph;

(d) means independent of a graph sheet disposed in said holder for continuously varying the amount of light translated in the image of each section of a graph on the sheet as it is scanned as a function of the instantaneous ordinate thereof;
(e) and photoelectric means for continuously converting the translated image to an electrical signal.

2. An apparatus for generating an electrical signal comprising:
(a) a sheet having a representation of a function thereon in the form of a contrasting line of uniform width;
(b) a stationary arcuate holder for the sheet;
(c) a rotatable mirror disposed coaxially with said holder, whereby said mirror scans said graph;
(d) means independent of a graph sheet disposed in said holder for continuously varying the amount of light translated in the image of each section of a graph on the sheet as it is scanned as a function of the instantaneous ordinate thereof;
(e) and photoelectric means for continuously converting the translated image to an electrical signal.

3. An apparatus for generating an electrical signal comprising:
(a) a sheet having a representation of a function thereon in the form of a contrasting line of uniform width;
(b) a holder for the sheet;
(c) means for uniformly illuminating a graph sheet disposed on said holder;
(d) means for scanning a sheet disposed on said holder and translating a continuous image of a narrow ordinate section of said sheet as it is scanned;
(e) means independent of a graph sheet disposed in said holder for continuously varying the amount of light translated in the image of each section of a graph on the sheet as it is scanned as a function of the instantaneous ordinate thereof;
(f) and photoelectric means for continuously converting the translated image to an electrical signal.

4. An apparatus for generating an electrical signal which is a representation of a function graphically illustrated on a sheet comprising:
(a) an arcuate holder for the sheet;
(b) means for scanning a sheet disposed on said holder and translating a continuous image of a narrow ordinate section of said sheet as it is scanned;
(c) a mask having an elongated tapered slot disposed in the path of the light from said scanning means for limiting the length of the section of the graph imaged by said scanning means as the graph is scanned as a function of the instantaneous ordinate thereof;
(d) and photoelectric means for continuously converting the translated image to an electric signal.

5. An apparatus for generating an electrical signal which is a representation of a function graphically illustrated on a sheet comprising:
(a) a rotatable cylindrical holder for the sheet;
(b) a stationary mirror disposed in an axial plane of said holder, whereby said mirror scans the graph;
(c) means for continuously varying the amount of light translated in the image of each section of a graph on the sheet as it is scanned as a function of the instantaneous ordinate thereof;
(d) and photoelectric means for continuously converting the translated image to an electrical signal.

6. An apparatus for generating an electrical signal which is a representation of a function graphically illustrated on a sheet comprising:
(a) a translucent rotatable cylindrical holder for the sheet;
(b) an elongated lamp adjacent and outside said holder and lying in an axial plane thereof;

(c) a stationary mirror disposed in an axial plane of said holder, whereby said mirror scans the graph;
(d) means for continuously varying the amount of light translated in the image of each section of a graph on the sheet as it is scanned as a function of the instantaneous ordinate thereof;
(e) and photoelectric means for continuously converting the translated image to an electrical signal.

7. An apparatus for generating an electrical signal which is a representation of a function graphically illustrated on a sheet comprising:
(a) a rotatable cylindrical holder for the sheet;
(b) a stationary mirror disposed in an axial plane of said holder but inclined substantially 45° to the axis thereof, whereby said mirror scans the graph;
(c) means for continuously varying the amount of light translated in the image of each section of a graph on the sheet as it is scanned as a function of the instantaneous ordinate thereof;
(d) and photoelectric means for continuously converting the translated image to an electrical signal.

8. An apparatus for generating an electrical signal comprising:
(a) a sheet having a representation of a function thereon in the form of a contrasting line of uniform width;
(b) a rotatable cylindrical holder for the sheet;
(c) an elongated narrow slit disposed adjacent said holder and lying in an axial plane thereof for translating a continuous image of a narrow ordinate section of said sheet as it is scanned;
(d) means independent of a graph sheet disposed in said holder for continuously varying the amount of light translated in the image of each section of a graph on the sheet as it is scanned as a function of the instantaneous ordinate thereof;
(e) and photoelectric means for continuously converting the translated image to an electrical signal.

9. An apparatus for generating an electrical signal comprising:
(a) a sheet having a representation of a function thereon in the form of a contrasting line of uniform width;
(b) a rotatable translucent cylindrical holder for the sheet;
(c) an elongated lamp adjacent and inside said holder and lying in an axial plane thereof;
(d) an elongated narrow slit disposed adjacent and outside said holder and lying substantially in said axial plane thereof for translating a continuous image of a narrow ordinate section of said sheet as it is scanned;
(e) means independent of a graph sheet disposed in said holder for continuously varying the amount of light translated in the image of each section of a graph on the sheet as it is scanned as a function of the instantaneous ordinate thereof;
(f) and photoelectric means for continuously converting the translated image to an electrical signal.

References Cited by the Examiner

UNITED STATES PATENTS

| | | | |
|---|---|---|---|
| 2,410,550 | 11/1946 | Padva | 235—197 |
| 3,068,361 | 12/1962 | Lannan | 235—197 |
| 3,088,297 | 5/1963 | Kapany et al. | 88—1 |

OTHER REFERENCES

Cairns: "Rotating Cylinder Function Generator," reprinted from The Review of Scientific Instruments, vol. 31, No. 4, 454–455 (one page) April 1960.

MALCOLM A. MORRISON, *Primary Examiner.*

K. W. DOBYNS, I. KESCHNER, *Assistant Examiners.*